United States Patent [19]

Martin et al.

[11] Patent Number: 5,009,007

[45] Date of Patent: Apr. 23, 1991

[54] WINDOW CUTTER FOR GAS SERVICE TIE OVERS

[76] Inventors: Luther W. Martin, 1221 Julie Dr., Champaign, Ill. 61821; Richard L. Smith, R.R. 2 - Box 82A, Edwardsville, Ill. 62025

[21] Appl. No.: 425,101

[22] Filed: Oct. 23, 1989

[51] Int. Cl.$^5$ .............................................. B22B 5/00
[52] U.S. Cl. ......................................... 30/92; 83/745
[58] Field of Search ............... 83/54, 488, 745; 30/92, 30/92.5, 372

[56] References Cited

U.S. PATENT DOCUMENTS 3,115,909 12/1963 McManama ..................... 83/745 X

Primary Examiner—Douglas D. Watts
Attorney, Agent, or Firm—Barnes & Thornburg

[57] ABSTRACT

A pipe slitter comprises a base for fixing the slitter to a pipe to be slit thereby. The base includes a pair of end plates for mounting transversely of the pipe and a pair of connecting rods for coupling the end plates to each other. The connecting rods extend longitudinally of the pipe. A carriage supports a slitter blade. The carriage is movably supported on the base for movemenet longitudinally of the pipe. The slitter blade is movably supported on the carriage for movement transversely of the pipe.

10 Claims, 1 Drawing Sheet

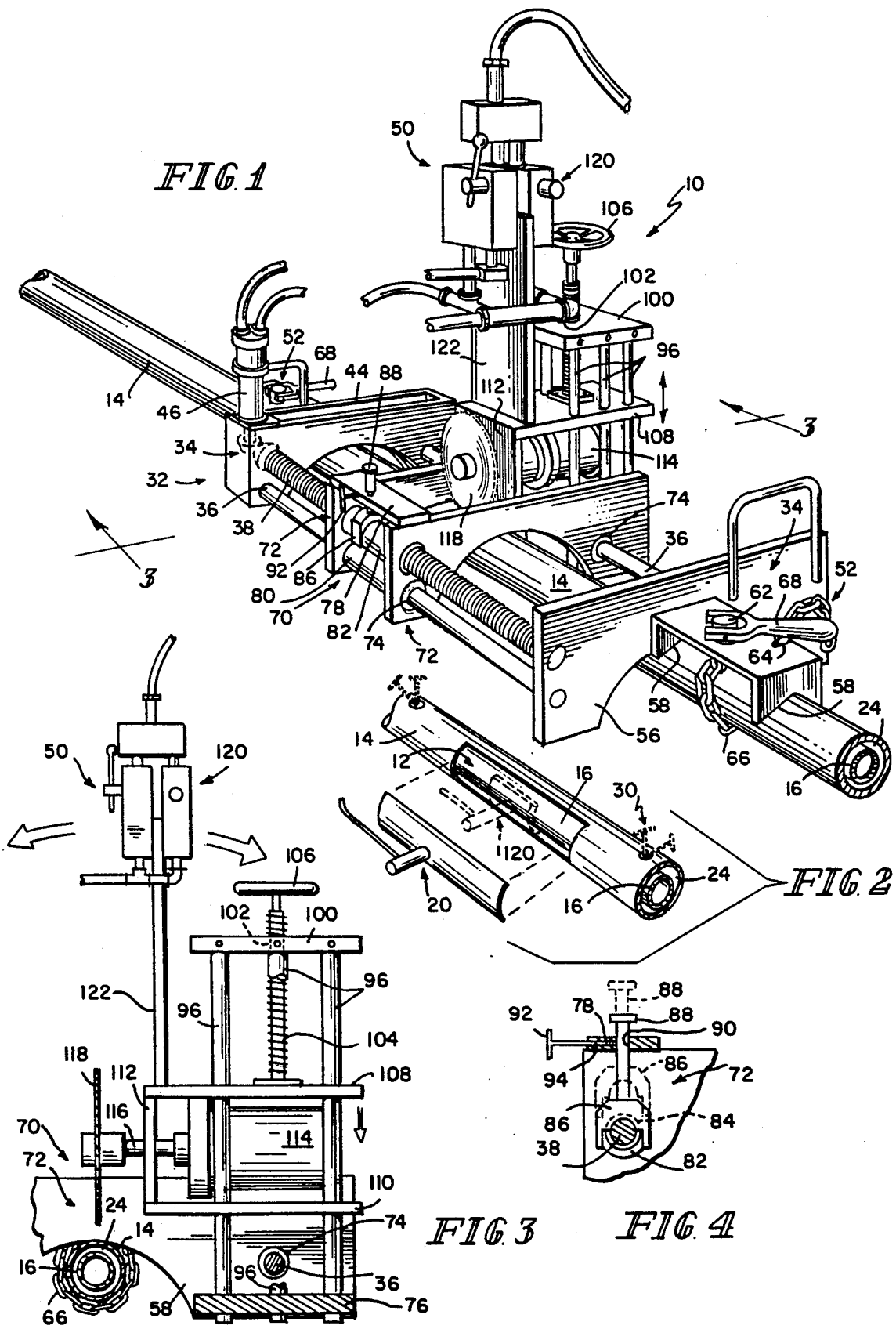

WINDOW CUTTER FOR GAS SERVICE TIE OVERS

This invention relates to apparatus for cutting windows and elongated slots in tubing. It is disclosed in the context of a window cutter for steel gas main or the like, but is believed to be useful in other areas as well.

Various techniques are known for the insertion of new, smaller diameter, typically polyethylene, gas main into old, larger diameter, typically steel, main while the old main remains pressurized with natural gas. Some of these techniques, as well as the reasons why such insertions are necessary and desirable, are illustrated and described in: Rohrer U.S. Pat. Nos. 3,688,801 and 3,845,789; and Martin et al. U.S. Pat. Nos. 4,009,732; 4,090,534; 4,252,152; and 4,253,497. These patents are listed as exemplary only and no representation is made or intended that they are exhaustive on the current state of this art.

In any event, once the insertion process is completed, it is necessary sooner or later to tie the customer's service over from the outer steel main to the inner polyethylene main. It is in this context that the present invention finds particular utility.

According to the invention, a pipe slitter comprises a base for fixing the slitter to a pipe to be slit thereby, a carriage for supporting a slitter blade, means for movably supporting the carriage on the base for movement longitudinally of the pipe, and means for movably supporting the slitter blade on the carriage for movement transversely of the pipe.

Illustratively, the base comprises a pair of end plates for mounting transversely of the pipe and a pair of connecting rods for coupling the end plates to each other. The connecting rods extend longitudinally of the pipe.

Additionally, the means for movably supporting the carriage on the base comprises a threaded shaft, means for rotatably supporting the threaded shaft between the end plates, and means for rotating the threaded shaft. The carriage includes means for following the threaded shaft.

Further according to an illustrative embodiment, the means for rotating the threaded shaft comprises a motor, means for mounting the motor on the base, and means for coupling the motor to the threaded shaft.

Additionally according to an illustrative embodiment, the motor comprises a fluid motor having a rotary output shaft, and the means for coupling the motor to the threaded shaft comprises a gear on the motor output shaft and a meshing gear on the threaded shaft.

Illustratively, the means for movably supporting the slitter blade on the carriage comprises a second pair of plates, a second plurality of connecting rods connecting the plates of the second pair, a second motor support, means for selectively moving the second motor support on the second connecting rods, a second motor, and means for coupling the second motor to the slitter blade.

Additionally, the means for selectively moving the second motor support on the second connecting rods comprises a second threaded shaft, means for rotatably coupling the second threaded shaft to the second motor support, and means providing a second threaded opening in one of the plates of the second pair. The threads of the threaded opening engage the threads of the second threaded shaft. Means are provided for turning the second threaded shaft to move the second motor support relative to said one of the plates of the second pair.

Further according to an illustrative embodiment, the slitter blade comprises a milling cutter, the second motor comprises a second rotary output shaft, and the means for coupling the second motor to the slitter blade comprises means for mounting the milling cutter on the second output shaft.

The invention may best be understood by referring to the following description and accompanying drawings which illustrate the invention. In the drawings:

FIG. 1 illustrates a partly fragmentary perspective view of a window cutter according to the present invention;

FIG. 2 illustrates a perspective view of a length of steel main having a length of polyethylene main lying inside of it with an elongated window opened therein to expose the length of polyethylene main;

FIG. 3 illustrates a fragmentary sectional view of the window cutter of FIG. 1, taken generally along section lines 3—3 thereof; and FIG. 4 illustrates an enlarged view of a detail of the window cutter of FIG. 1.

The window cutter 10 is used to cut windows 12 (FIG. 2) in a length 14 of larger diameter steel main into which a length 16 of smaller diameter polyethylene main has been inserted. The windows 12 are ordinarily cut at the locations at which the outer main 14 is tapped 20 to provide gas service to a customer. The windows 12 are cut when it is desirable to tie over the customer's gas service to the inner main 16. This tying of service over to the inner main ordinarily progresses upstream from the farthest downstream end of the larger diameter steel main 14, so that there is no need to provide a bypass around the window 12 site to continue gas service to (a) downstream customer(s). However, it is not essential to the use of the inventive window cutter 10 that this be the case. It can be used equally as effectively either where some service locations are to be bypassed, providing gas service both upstream and downstream therefrom through the annular space 24 between mains 14 and 16 or where the window 12 location is to be at the farthest downstream end of a length 14 of larger diameter main.

The cutter 10 comprises a frame 32 (FIG. 1) having a pair of endplates 34 between which extend a pair of circular cross section guide rods 36. The endplates 34 are provided on their bottoms with arcuate cutouts 40 but they are otherwise generally rectangular in shape. Guide rods 36 are fixed in endplates 34. A lead screw 38 is rotatably mounted between endplates 34. A motor bracket 44 having the same configuration as endplates 34 is spaced from one of them, and a hydraulic motor 46 is mounted on and between that endplate 34 and motor bracket 44. Hydraulic motor 46 is operatively coupled by bevel gears to lead screw 38 to rotate lead screw 38 when motor 46 is energized from a suitable source of hydraulic fluid through a motor 46 on/off valve 50.

A clamp 52 of generally inverted U-shaped configuration transversely to the longitudinal extent of the length 14 of steel main is attached to each of the outwardly facing surfaces 54, 56 of frame 32. Each clamp 52 has downwardly opening V-shaped notches 58 in the edges of the legs of the U. Notches 58 accommodate the circular cross section of length 14 of steel main during the window 12 cutting process. A pivotal connector 62 is provided at about the middle of the bight of the U of each clamp 52 and a slot 64 is provided along one edge of the bight of the U. The pivotal connector 62 is provided on the inside of the U with a length 66 of chain. On the outside of the U, the top of the clamp 52, connector 62 is provided with a pivotally mounted handle 68 which permits twist-tightening of the chain 66 around the length 14 of steel main when a link of the chain 66 is inserting into slot 64 and handle 68 is turned. This clamps frame 32 to the length 14 of steel main.

Window cutter 10 further comprises a carriage 70 having a pair of endplates 72. Endplates 72 have the same configuration as endplates 34. Endplates 72 include ball bushings 74 through which guide rods 36 extend. On one side of the length 14 of steel main, endplates 72 are joined together by a generally rectangular plate 76 (FIG. 3). On the other side of the length 14 of steel main, endplates 72 are joined by a somewhat narrower, generally rectangular plate 78. Beneath plate 78, endplates 72 are joined by two vertically spaced tubular members 80, 82. One of rods 36 extends through the lower 80 of these members. The lead screw 38 extends through the upper 82 of them. A transversely extending slot 84 (FIG. 4) in the sidewall of member 82 exposes the threads of lead screw 38. A lead screw follower 86 is held in engagement with the threads of lead screw 38 by a follower stem 88 which is reciprocable in a hole 90 in plate 78. A thumbscrew 92 is threaded through a hole 94 in an edge of plate 78 selectively to lock lead screw follower 86 into engagement with lead screw 38 or to release lead screw follower 86 from engagement with lead screw 38.

Three guide rods 96 extend upwardly adjacent each transverse edge of plate 76. The other ends of guide rods 96 are fixed adjacent the longitudinal edges of a plate 100. A central threaded aperture 102 in plate 100 is engaged by a jacking screw 104 having a handwheel 106 fixed to its upper end. The lower end of jacking screw 104 is rotatably mounted to an upper, generally rectangular, motor carriage plate 108. A lower, generally rectangular, motor carriage plate 110 is joined to plate 108 along one longitudinal edge of each of them by a motor carriage side plate 112. Plates 108, 110 are provided with ball bushings which permit their sliding motion up and down on guide rods 96 as jacking screw 104 is turned. A hydraulic motor 114 is mounted on plate 108 and the shaft 116 of motor 114 extends through a hole provided therefor in plate 112. Shaft 116 mounts a milling cutter 118. Hydraulic motor 114 is energized from a suitable source of hydraulic fluid through a motor 114 on/off valve 120. Valve 120, along with valve 50 and their hydraulic fluid supply and return connections, are mounted on a bracket 122 which extends upward from plate 108.

In operation, after the appropriate seal(s) is(are) placed in annular space 24, window cutter 10 is first clamped, using clamps 52 to the length 14 of steel main, with one of endplates 34 on each side of the site of window 12. Lead screw follower 86 is engaged with lead screw 38 and thumbscrew 92 is tightened. Jacking screw 104 is turned to elevate milling cutter 118 into contact with the sidewall of main 14 at the point around the circumference of main 14 wherein the first longitudinal cut is to be made. Valve 120 is opened and jacking screw 104 is then manipulated to insure that the entire thickness of the wall of main 14 has been penetrated. Valve 50 is then opened, turning lead screw 38 and driving milling cutter 118 the desired distance along the length 14 of main to define one longitudinal edge of the window 12. Valves 50, 120 are then closed, jacking screw 104 is manipulated to raise milling cutter 118 out of its cut, and thumbscrew 92 is turned to release lead screw follower 86. Carriage 70 is then returned to the starting point of the cut just made. The clamps 52 are loosened enough to permit tilting of the cutter 10 in one direction or the other until the milling cutter 118 is over the site of the other longitudinal edge of the window 12 and the procedure is carried out again. The ends of the window 12 are then finished, for example, with a pipe cutter, and the service 20 is tied over from the annular space 24 to the inner main 16.

What is claimed is:

1. A pipe slitter comprising a base for fixing the slitter to a pipe to be slit thereby, the base comprising a pair of end plates for mounting transversely of the pipe and a pair of connecting rods for coupling the end plates to each other, the connecting rods extending longitudinally of the pipe, a carriage for supporting a slitter blade, means for movably supporting the carriage on the base for movement longitudinally of the pipe, and means for movably supporting the slitter blade on the carriage for movement transversely of the pipe.

2. The apparatus of claim 1 wherein the means for movably supporting the carriage on the base comprises a threaded shaft, means for rotatably supporting the threaded shaft between the end plates, and means for rotating the threaded shaft, the carriage including means for following the threaded shaft.

3. The apparatus of claim 2 wherein the means for rotating the threaded shaft comprises a motor, means for mounting the motor on the base, and means for coupling the motor to the threaded shaft.

4. The apparatus of claim 3 wherein the motor comprises a fluid motor having a rotary output shaft, and the means for coupling the motor to the threaded shaft comprises a gear on the motor output shaft and a meshing gear on the threaded shaft.

5. The apparatus of claim 4 wherein the means for movably supporting the slitter blade on the carriage comprises a second pair of plates, a second plurality of connecting rods connecting the plates of the second pair, a second motor support, means for selectively moving the second motor support on the second connecting rods, a second motor, and means for coupling the second motor to the slitter blade.

6. The apparatus of claim 5 wherein the means for selectively moving the second motor support on the second connecting rods comprises a second threaded shaft, means for rotatably coupling the second threaded shaft to the second motor support, means providing a second threaded opening in one of the plates of the second pair, the threads of the threaded opening engaging the threads of the second threaded shaft, and means for turning the second threaded shaft to move the second motor support relative to said one of the plates of the second pair.

7. The apparatus of claim 6 wherein the slitter blade comprises a milling cutter, the second motor comprises a second rotary output shaft, and the means for coupling the second motor to the slitter blade comprises means for mounting the milling cutter on the second output shaft.

8. A pipe slitter comprising a base for fixing the slitter to a pipe to be slit thereby, a carriage for supporting a slitter blade, means for movably supporting the carriage on the base for movement longitudinally of the pipe, and means for movably supporting the slitter blade on the carriage for movement transversely of the pipe, the means for movably supporting the slitter blade on the carriage comprising a pair of plates, a plurality of connecting rods extending between the plates, a motor support, means for movably mounting the motor support from the connecting rods, means for selectively moving the motor support on the connecting rods, a motor, and means for coupling the motor to the slitter blade.

9. The apparatus of claim 8 wherein the means for selectively moving the motor support on the connecting rods comprises a threaded shaft, means for rotatably coupling the threaded shaft to the motor support, means providing a threaded opening in one of the plates, the threads of the threaded opening engaging the threads of the shaft, and means for turning the threaded shaft to move the motor support relative to said one of the plates.

10. The apparatus of claim 9 wherein the slitter blade comprises a milling cutter, the motor comprises a rotary output shaft, and the means for coupling the motor to the slitter blade comprises means for mounting the milling cutter on the output shaft.

* * * * *